United States Patent [19]
Matouka et al.

[11] Patent Number: 5,211,455
[45] Date of Patent: * May 18, 1993

[54] ANTI-LOCK BRAKING SYSTEM

[75] Inventors: Michael F. Matouka, Utica, Mich.; Yudh V. Rajput, Xenia, Ohio; Paul D. Wilkey, Vandalia, Ohio; James A. Bright, Dayton, Ohio

[73] Assignee: General Motors Corporation, Detroit, Mich.

[*] Notice: The portion of the term of this patent subsequent to Apr. 30, 2008 has been disclaimed.

[21] Appl. No.: 676,925

[22] Filed: Mar. 28, 1991

Related U.S. Application Data

[63] Continuation of Ser. No. 353,320, May 17, 1989, Pat. No. 5,011,237.

[51] Int. Cl.$^5$ ............................................... B60J 8/42
[52] U.S. Cl. ................................................. 303/115.2
[58] Field of Search ...... 303/115 EC, 113 B, 113 TP; 192/8 R, 8 C, 12 BA, 26, 35

[56] References Cited

U.S. PATENT DOCUMENTS

| | | | |
|---|---|---|---|
| 2,372,693 | 4/1945 | Swift, Jr. | 192/8 C |
| 2,458,441 | 1/1949 | Starkey | 192/8 R |
| 3,549,210 | 12/1970 | Birge et al. | 303/115 EC |
| 3,598,210 | 8/1971 | Barr | 192/38 |
| 3,726,372 | 4/1973 | Baer et al. | 192/26 |
| 3,915,268 | 10/1975 | MacDonald | 192/12 BA |
| 4,576,768 | 2/1986 | Nishimura et al. | 192/35 |
| 4,653,815 | 3/1987 | Agarwal et al. | 303/115 EC |
| 4,953,676 | 9/1990 | Yamada et al. | 192/12 BA |
| 5,011,237 | 4/1991 | Matouka et al. | 303/115 EC |

Primary Examiner—Matthew C. Graham
Attorney, Agent, or Firm—Ernest E. Helms

[57] ABSTRACT

A vehicle braking system is provided. In a preferred embodiment the system has an actuator frame with a bore fluidly connected to the wheel brake and to a master cylinder via a solenoid valve. A piston, mounted within the bore, is operationally associated with a non-rotative nut which is threadably engaged by a power screw. To maximize reaction speed, a high efficiency thread is utilized between the power screw and the non-rotative nut. Therefore, pressure within the actuator can back drive the piston. To prevent backdriving of the piston there is a spring locking mechanism.

21 Claims, 3 Drawing Sheets

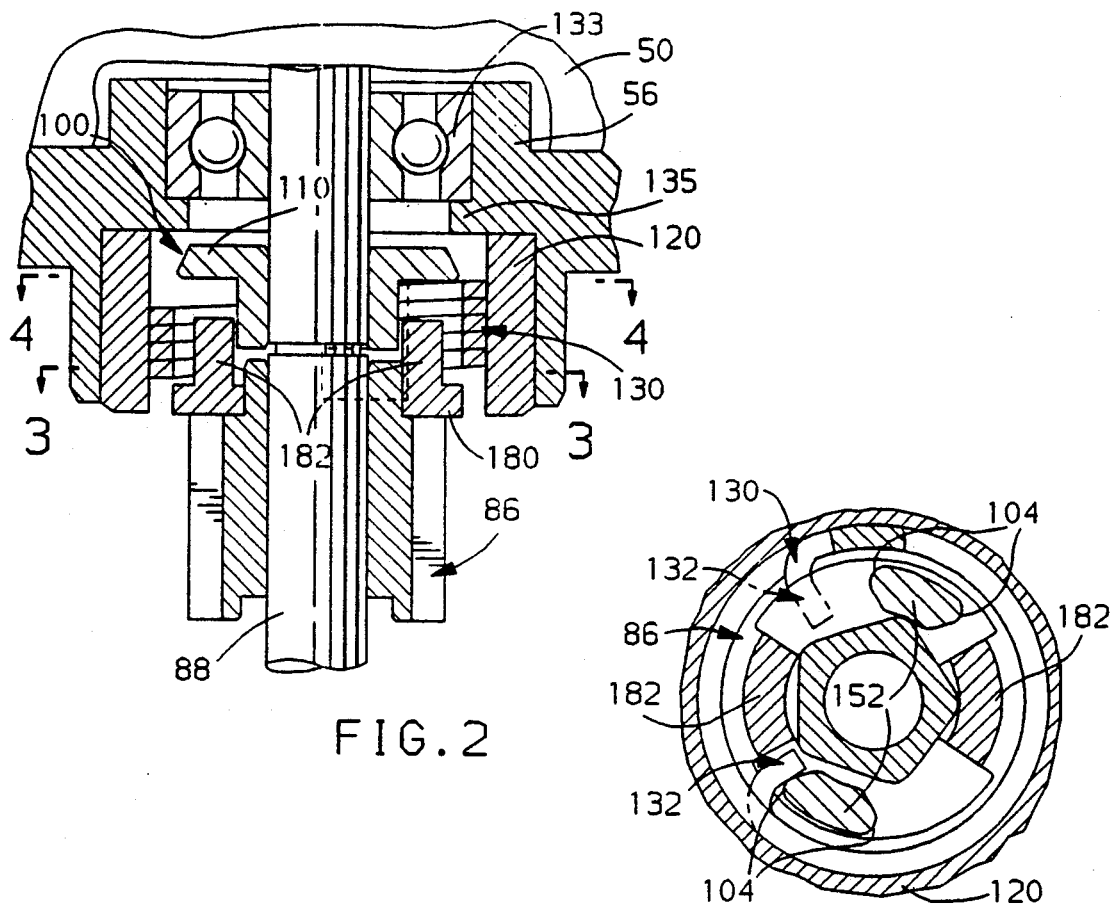
FIG.2
FIG.3
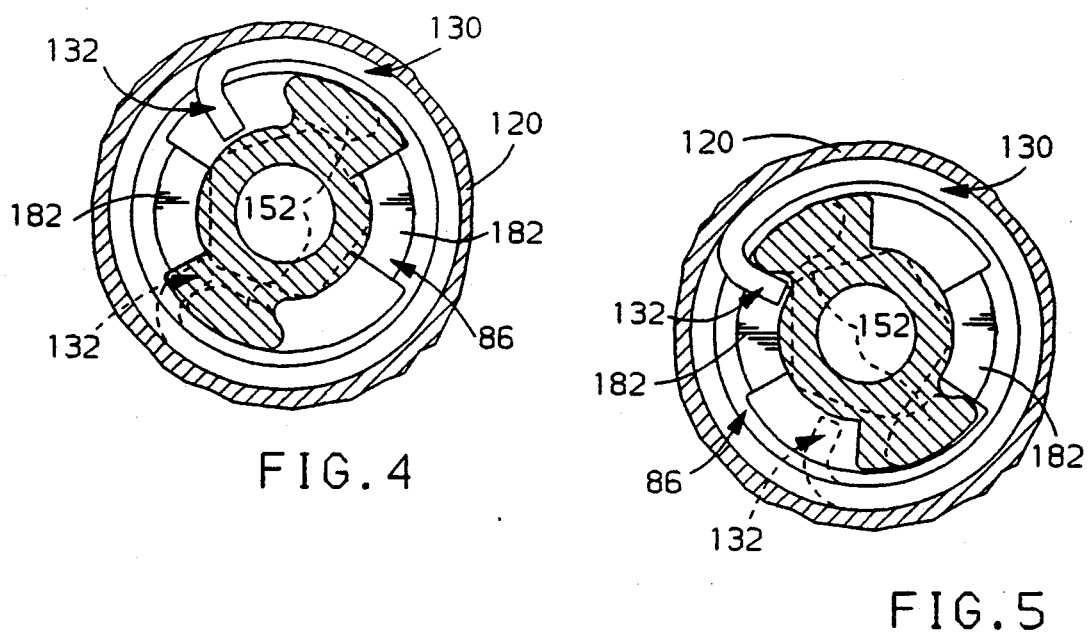
FIG.4
FIG.5

ANTI-LOCK BRAKING SYSTEM

This is a continuation of application Ser. No. 07/353,320, filed on May 17, 1989, now U.S. Pat. No. 5,011,237.

FIELD OF THE PRESENT INVENTION

The field of the present invention is that of anti-lock braking systems (ABS) for automotive vehicles.

DISCLOSURE STATEMENT

Anti-lock braking systems typically modulate the pressure delivered to a vehicle wheel brake to prevent the vehicle wheel from locking up in the braking condition. Two prior anti-lock braking systems are shown in commonly assigned U.S. Pat. Nos. 4,653,815 and 4,756,391. In both of the aforementioned systems, an electronic controller signals a motor which is gearably engaged with a driven member which is in turn threadably engaged with an actuator piston, piston movement is used to modulate the pressure delivered to the vehicle wheel brake.

SUMMARY OF THE INVENTION

The present invention provides a vehicle anti-lock braking system which is an alternative to the aforementioned anti-lock braking systems. To reduce the space envelope of the aforementioned systems, the present in a preferred embodiment invention provides a piston which is attached to a non-rotative nut which is threadably engaged by a power screw rather than having the piston attached to a non-rotative screw which is engaged by a rotative nut. The above modification allows the present invention to provide anti-lock braking systems wherein the components are smaller and wherein there is less rotative mass, thereby greatly reducing the angular inertia of the system.

Furthermore, in a preferred embodiment, the present invention provides an actuator with a check valve providing an alternative flow pattern from the master cylinder to the wheel brake (cylinder). The check valve is opened by the piston itself. Therefore, there is an alternative flow path to the wheel brake.

To maximize reaction speed, a high efficiency thread is utilized between the power screw and the non-rotative nut. Therefore, pressure within the actuator can back drive the piston. In the preferred embodiment the present invention is configured in such a manner and that the piston is at its extreme position opens the check valve when the system is not in the ABS mode of operation. The piston can be held with an inefficient screw. However, it has been found preferable to use an efficient screw (to lower the current required by the motor). Therefore, to make the present invention work, there must be some means of holding the piston at its extreme position when it is exposed to master cylinder pressure, but not within the ABS mode wherein the motor is being powered. Space limitations under the hood of an auto require that the solution to the above need take up as little space as possible.

One method to prevent back drive of the piston is to use an electromagnetic brake which restrains movement of the motor. Such an anti-lock braking system is disclosed in U.S. Pat. No. 5,000,523. The present invention provides an anti-lock braking system which is an alternative to that found in Mikhaeil.

It is an object of the present invention to provide an anti-lock braking system.

Other objects and advantages of the present invention can become more apparent to those skilled in the art as the nature of the invention is better understood from the accompanying drawings and a detailed description.

BRIEF DESCRIPTION OF THE DRAWINGS

FIG. 2 is a sectional view illustrating details of an anti-lock braking system illustrated in FIG. 1;

FIGS. 3 and 4 are views taken along lines 3—3 and 4—4 respectively of FIG. 2;

FIG. 5 is a view illustrating the driver rotated from the position shown in FIG. 4;

DETAILED DESCRIPTION OF THE DRAWINGS

Figure 1:
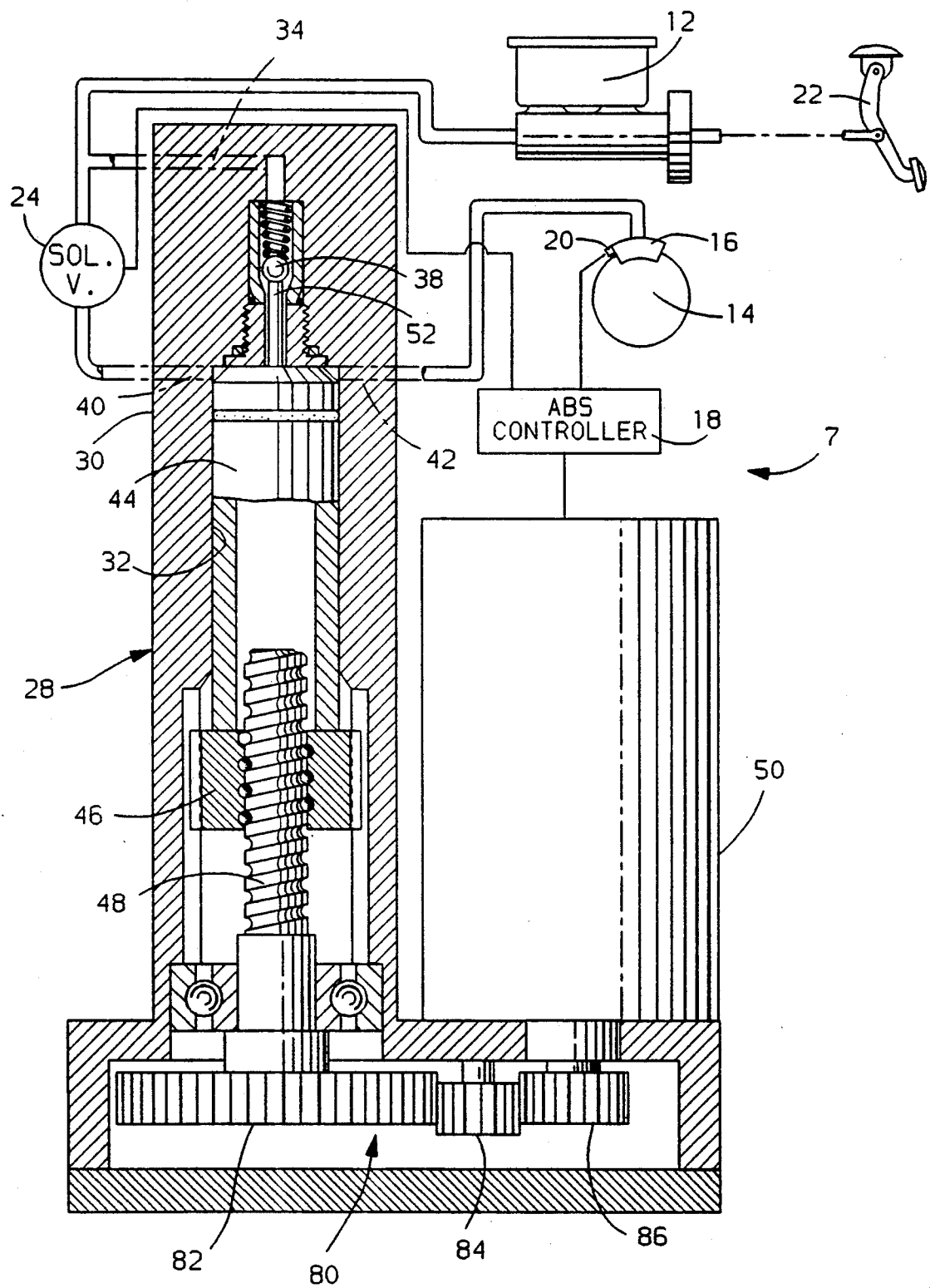
FIG. 1 is a schematic view show partially in section of a preferred embodiment of the present invention for one vehicle wheel brake.
Figure 6:
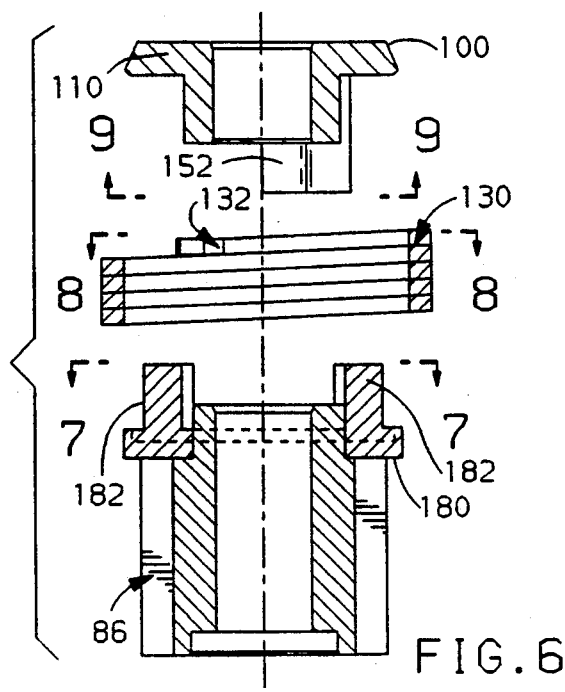
FIG. 6 is an exploded view of the spring driver and pinion gear utilized in the anti-lock braking system of the present invention.
Figure 7:
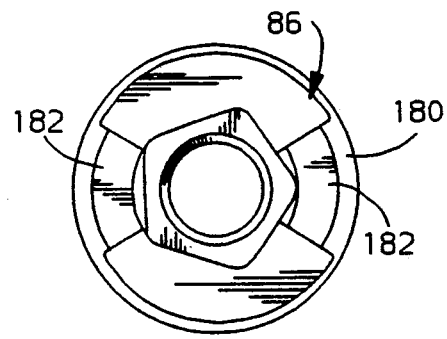
FIGS. 7, 8 and 9 are views taken along lines 7—7, 8—8 and 9—9, respectively, of FIG. 6.

The vehicle wheel anti-lock braking system 7 of the present invention includes a master cylinder 12 for supplying pressurized fluid. Connected on the wheel 14 and schematically shown, is a fluid activated wheel brake cylinder 16 (hereinafter referred to as a wheel brake) which receives pressurized fluid from the master cylinder for restraining rotational movement of the wheel 14. The wheel brake 16 may be utilized in a conventional drum or disc type vehicle brake.

An ABS electronic controller 18 is also provided. A sensor 20 in the vehicle wheel brake 16, determines the wheel 14 rotational speed and a sensor (not shown) determines whether or not the brake pedal 22 of the vehicle is activated. Both sensors feed information to the ABS controller 18. The ABS controller 18 will be cognizant of the rotational condition of the wheel and will provide an appropriate signal in response thereto. The signal will place the brake system in an ABS mode of operation if the condition of the wheel 14 is within preset parameters.

A normally open solenoid valve 24, when activated to a closed position in response to a signal given by the controller 18, functions as an isolation valve to prevent fluid communication between the master cylinder 12 and the wheel brake 16. An actuator 28 is provided having an actuator frame 30 with a longitudinal bore 32. An actuator can be provided for each wheel brake of the vehicle or if desired, a plurality of wheel brakes can be connected to a single actuator. The longitudinal bore 32 has a first fluid connection 42 allowing fluid communication with the wheel brake 16 and the longitudinal bore 32 also has fluid communication with the master cylinder 12 when the solenoid valve 24 is not activated to the closed position via passage 40. Additionally, as shown, the longitudinal bore has a second or alternative fluid communicative path with the master cylinder 12. As shown, the bore 32 is midstream of the solenoid valve 24 and passages 42. Fluid flow passes over a transverse slot (not shown) of a piston 44. However, the solenoid valve 24 could directly tie into the wheel brake 16 and passage 42 could "T" into that line. The alternative path 34 has a check valve 38 whose function will be described later. The check valve 38 allows delivery of fluid back to the master cylinder 12 whenever the wheel brake 16 has a pressure greater than that in the master cylinder 16. Therefore, the braking system is sensitive to an operator relieving the brake by removing his or her foot therefrom without any needed input from the controller.

The piston 44 is slidably and sealably mounted within the longitudinal bore 32. Movement of the piston 44 provides a variable control volume in communication with the wheel brake 16, thereby modulating the pressure therein. A nut 46 operatively associated with piston 44 is connected with the piston 44 and the nut 46 is slidably mounted within the longitudinal bore 32 in a non-rotative fashion.

A power screw 48 projects into the nut and is threadably engaged therewith in an efficient manner. The power screw has a fixed rotational axis with respect to the actuator frame 30. Powering the power screw is a reversible DC motor 50 which is responsive to the signals given to it by the controller 18. In the position shown, for normal braking operation, the piston 44 is held at the extreme up position and must be held within a tolerance of 3/100 of an inch to maintain the check valve 38 in the open position via the rod 52 (tolerance shown in FIG. 1 greatly enlarged for purposes of illustration).

The power screw 48 is connected to a gear train 80 which is in turn connected also with the motor 50. The power screw is mounted by bearings and has a end large gear 82 connected to the end thereto. The large gear 82 meshes with an idler gear 84 which in turn meshes with a smaller pinion gear 86. The pinion gear 86 axially floats on a rotor shaft 88 of the motor and is held on by a spring clip (not shown). Fixably connected to the rotor shaft 88 projecting away from the motor is a driver member 100 (herein after referred to as the driver). The driver 100 has a flange portion 110 towards the end of the motor and is symmetrical and rotationally balanced. The driver 100 also has four tang contact surfaces 104 whose function will be described later. The driver 100 has an angular position which corresponds with the position of the rotor shaft 88.

Generally surrounding the driver 100 and located between the motor and the power screw (in the example shown) adjacent to the DC motor is a sleeve 120 having a location generally fixed with respect to the motor 50.

The sleeve 120 has a generally smooth sliding surface on the interior and has an inner diameter of a first value. A spring 130 which has a free outer diameter of a second value equal to or greater than said first value is captured within the non-rotative sleeve 120. The coil spring 130 at both ends has a generally radially inward, projecting tang 132 with a radius curvature equal to the spring thickness. The tangs 132 will project inward intersecting a line tangent with the sleeve 120 at angle less than 90 degrees and at their inner most radial portion 134 have a generally straight section 136. Typically, the spring will be made with piano wire with a square or rectangular cross-sectional shaped area.

The motor's housing 56 has a three diameter inner bore. In the inward inner diameter of the bore a ball bearing 133 is press-fitted therein. The ball bearing 133 mounts the rotor shaft 88. The rotor shaft 88 projects outwards and has the driver 100 keyed, splined, or pressed fitted to it the driver 100.

Separated by a landing 135 in the housing inner bore from the bearing 133 and press-fitted in its third interior diameter is the sleeve 120.

Figure 8:
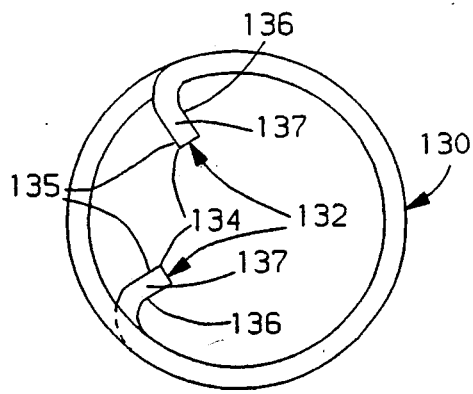
Figure 9:
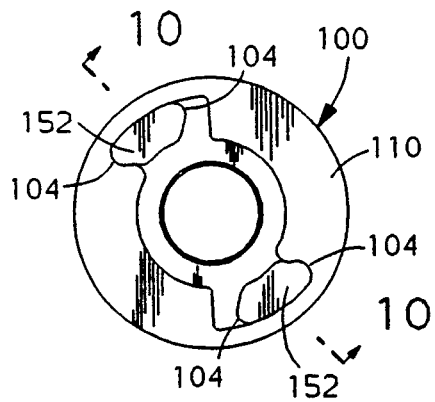
Figure 10:
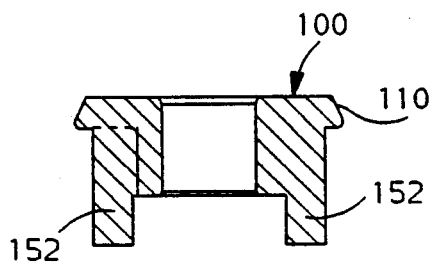
FIG. 10 is a view taken along line 10—10 of FIG. 9.
Figure 11:
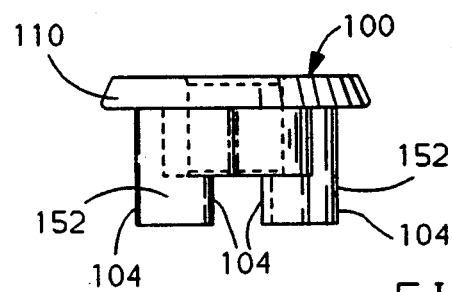
FIG. 11 is a side elevational view of the driver illustrated in FIGS. 2, 6, 9 and 10.

Lockably engaged with the sleeve is the spring 130 with its two radially inward facing tangs 132. The tangs are configured in such a manner that rotation of the driver causes the curved driver tang contact surface 104 to in part force to the spring tangs 132 pulling the tangs 132 radially inward, thereby causing the multiple-turn spring 130 to contract, and allow the rotor 88 to turn, and therefore transfer torque to the driven pinion gear 86 and thereafter to the power screw 46. The pinion gear 86 is axially slidable upon the end of the rotor shaft 88, however, it has a snap ring (not shown) which connects it thereto. The axial sliding movement is provided so that thermal expansion will not cause the pinion gear 86 to make contact with the sleeve 120 or the motor housing 56. The pinion 86 has a flange 180 and the spring 130 is axially captured between the flanges 110, 180 of the driver and the pinion. The pinion gear also has lobe torque transfer portions 182 which project into the sleeve. The lobe sections are contacted by the torque transfer portions 152 of the driver 100 to receive imparted force by the driver 100 to transfer torque between the members. However, the pinion gear typically will have two 182 lobes but only needs to have one. One pinion 182 lobe must provide a surface to make contact with one of the spring tangs on the opposite end 135 of the tang that the contact surface 104 of the driver makes contact on to cause spring tang 132 to expand outward to lock the motor 50. The locking action is provided in the direction from the piston's extreme position near its fluid connection with the wheel cylinder (As shown in FIG. 1). Therefore, from above-described extreme position, rotating downward or in other word, retractive movement of the piston 44 caused by fluid pressure within the longitudinal bore 32 will cause the lobe 182 on the pinion to hit the spring tang 132 on the opposite side 135 (FIG. 8) that the spring tang is hit by the driver contact surface 104 causing the spring tang to be forced outward expanding the spring and preventing transfer torque from the power screw 48 back to the motor rotor shaft 88 thereby locking the piston in its extreme position within 3/100 of an inch from the top. Therefore, the check valve 38 is maintained in an open position. In most application locking of the location of the piston 44 as from its lower extreme position will not be relevant.

The spring 130 is configured in such a manner that once one of the rotor shaft 88 (or driver 100) contact surfaces 104 is in contact with the tang 132 the rotor only has to turn approximately 5° more to release the spring 130. The torque transfer portion 152 of the driver 100 will start turning the pinion 86 before the spring contact surface of the pinion (lobe) 182 can contact the tang 132 of the spring. Therefore, when the motor 50 is driving the piston 44 upward, there is isolation of the spring tang 182 from the pinion lobe 182 from a fraction of a degree to approximately 5 degrees in a preferred embodiment of the invention illustrated in FIGS. 3–5. In other words, tang isolation means that the tang is not sandwiched between the driver lobe 152 and the pinion lobe 182.

First, the tang isolation is important in that when the motor 50 is driving the piston 44 the rotor shaft 88 will start turning the pinion 86 before making contact with the spring tang 132 and, therefore, torsional slip between the pinion 86 and the driver 100 will not cause a chattering effect on the tang 132 of the spring 130 (the tang 132 is one of the most critical components in this ABS system in regards to reliability) and, therefore, spring 130 life is preserved. Secondly, when the motor 50 drives the piston 44 to its up extreme position, there is an impact force and the motor 50 will stall. However, instantaneously the actuator frame 30 will be loaded in tension. Instantaneously, the spring tension of the actuator frame 30 will cause a backward force or rearward force on the pinion gear 38, and the pinion gear will rotate slightly before the surface of its lobe 182 will come in contact with the spring tang side 135. The spring isolation allows the pinion gear to back-lash a few degrees to relieve tension of the actuator frame 30 before the pinion lobe locks up against the tang (lock up occurs in 1-5 degrees). Therefore, the pinion 86 can reverse slightly (relieving tension in the actuator frame), however, not as much as to allow the check valve 38 to close. Without the tang isolation, the reverse movement of the pinion 86 would not be possible. Without tang isolation the spring tang 132 will be instantly loaded and the piston 44 will remain in compression and in a position of tension loading the actuator frame 28 which places the whole gear train 80 under a high retained load in the non-ABS ode of operation (normal brake operation).

The spring contacting surface 104 of the driver is configured in such a manner as to impact a force to the tang normal to the generally straight portion 134. The rounded surface 104 provides almost point contact, imparting a force which also goes through the center of percussion 137 of the tang 132. Therefore, vibration of the tang 132 with respect to the driver contact surface 104 is minimized and tang 132 life is prolonged. The inward bend of less than 90° helps to prevent any tendency of the tang to straighten out since the surface 136 is less than 90° from the tangent. In other words, there is a small component of force directed inwards which tends to pull the spring away from the sleeve. It has also been found to be preferable that the radius of the tang 132 bend be in the neighborhood of 1 times the thickness of the wire of the spring 130 measured in the radial direction.

While one embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed as defined as follows:

1. A pressure actuator for a vehicle wheel braking system including a master cylinder means for supplying pressurized fluid, a wheel brake means receiving pressurized fluid from said master cylinder means and for restraining rotational movement of said wheel, and a controller cognizant of the rotational condition of said wheel and providing a signal when the rotational condition of said wheel is within present parameters, the actuator comprising:

an actuator frame having a bore with means of fluid communication with said wheel brake means;

a piston slidably sealably mounted within said bore for providing a variable control volume in communication with said wheel brake means and thereby modulating the pressure therein;

a nut operatively associated with said piston and slidably mounted within said bore in a non-rotative fashion;

a power screw projecting into said nut and threadedly engaged within in an efficient manner, said power screw having a fixed rotational axis with respect to said actuator frame;

reversible motor means for powering said power screw, said motor means being responsive to signals given by said controller;

a non-rotative sleeve located between said power screw and said motor means in a fixed position, said sleeve having an inner diameter of a first value;

a coil spring having a free outer diameter of a second value generally greater than said first value, said coil spring being captured within said non-rotative sleeve, and said coil spring having a tang on each end;

a driver member with a torsion transfer portion, said driver member having a rotational axis, said driver member having an angular position in correspondence with the angular position of said motor means, said driver member having first and second contact surfaces for imparting force to said spring tangs to cause said tangs to release and to allow said spring to have sliding movement within said non-rotative sleeve in both directions;

a driven member with an angular position in correspondence with the angular position of said power screw, said driven member having a rotational axis generally coterminous with said rotational axis of said driver member and said driven member having a torsion transfer portion for receiving force imparted by said driver member torsion transfer portion for transferring torque from said driver member to said power screw, said driven member having at least one contact surface for imparting force in the opposite angular direction on said spring tang said driver contact surface imparts force on said spring tang to cause said spring to radially expand and lock within said sleeve to prevent torque from said power screw being transferred to said motor means when said piston is moving away from a position more adjacent to said means of fluid communication of said actuator frame bore with said wheel brake means by fluid pressure within said bore.

2. A braking system as described in claim 1 wherein said driver member is fixably connected with a rotor of said motor means and said sleeve is generally adjacent to said motor means and said driven member is fixably connected with a gear and meshed with a gear train, the last gear of said gear train being connected with said power screw.

3. An actuator as described in claim 2 wherein said driven member is a first gear of a gear train the last gear of which being connected with said power screw and said first gear axially floats along its rotational axis with respect to said motor means.

4. An actuator as described in claim 1 wherein said driven member portion within said non-rotative sleeve is generally symmetrical and is rotationally balanced.

5. An actuator as described in claim 1 wherein said spring tang points generally in an inward radial direction.

6. An actuator as described in claim 2 wherein one of said tangs has bend radius approximating its thickness.

7. An actuator as described in claim 5 whereupon said driven member can reverse a predetermined amount from its position when said driver member is driving said driven member before said portion of said driven member makes contact with said tang to restrain rotation of said power screw and said spring tang is isolated from contact with said driven member contact surface when said driver member is transferring torque to said driven member.

8. An actuator as described in claim 5 wherein said spring tang has a generally straight portion in its inner most radial portion and one of said driver contact surface makes contact with said generally straight tang portion.

9. An actuator as described in claim 8 wherein one of said driver contact surface is rounded.

10. An actuator as described in claim 8 wherein said driver contact surface imparts a force to said spring tang inner radial portion normal said inner radial portion.

11. An actuator as described in claim 8 wherein one of said driver contact surface imparts a force to said spring tang through said spring tang center of percussion to minimize vibration of said tang when said tang is driven by said driver.

12. An actuator as described in claim 8 wherein said spring tang generally straight portion projects at an angle less than 90 degrees when intersecting the radius of said sleeve.

13. An actuator as described in claim 1 wherein said spring has a rectangular cross-sectional area.

14. An actuator as described in claim 1 wherein said driver member has flange means on one end for axially locating said spring.

15. An actuator as described in claim 14 further including said driven member having a flange means for restraining said spring in a direction along said driven members rotational axis generally away from said driver member.

16. A vehicle wheel anti-lock braking system (ABS) comprising:
   master cylinder means for supplying pressurized fluid;
   a wheel brake means receiving pressurized fluid from said master cylinder means and for restraining rotational movement of said wheel;
   an ABS controller cognizant of the rotational condition of said wheel and providing a signal when the rotational condition of said wheel is within present parameters;
   an actuator frame having a bore with means of fluid communication with said wheel brake means;
   a piston slidably sealably mounted with said bore for providing a variable control volume in communication with said wheel brake means and thereby modulating the pressure therein;
   a nut operatively associated with said piston and slidably mounted within said bore in a non-rotative fashion;
   a power screw projecting into said nut and threadedly engaged within in an efficient manner, said power screw having a fixed rotational axis with respect to said actuator frame;
   reversible motor means for powering said power screw, said motor means being responsive to signals given by said controller;
   a non-rotative sleeve located between said power screw and said motor means in a fixed position, said sleeve having an inner diameter of a first value;
   a coil spring having a free outer diameter of a second value generally greater than said first value, said coil spring being captured within said non-rotative sleeve, and said coil spring having a tang on each end;
   a driver member with a torsion transfer portion projecting into said non-rotative sleeve, said driver member having a rotational axis, said driver member having an angular position in correspondence with the angular position of said motor means, said driver member having first and second contact surfaces for engagement with said spring tangs to cause said tangs to release and to allow said spring to have sliding movement within said non-rotative sleeve in both directions;
   a driven member with an angular position in correspondence with the angular position of said power screw, said driven member having a rotational axis generally coterminous with said rotational axis of said driver member and said driven member having projecting into said sleeve a torsion transfer portion for making contact with said driver member torsion transfer portion for transferring torque from said driver member to said power screw, said driven member having at least one contact surface for making contact on said spring tang on the opposite side of said spring tang said driver contact surface makes contact on to cause said spring to radially expand and lock within said sleeve to prevent torque from said power screw being transferred to said motor means when said piston is moving away from a position more adjacent to said means of fluid communication of said actuator frame bore with said wheel brake means by fluid pressure within bore.

17. An ABS system as described in claim 16 wherein said portion of said driver projecting into said sleeve is generally symmetrical and is rotationally balanced.

18. A vehicle wheel braking system comprising:
   master cylinder means for supplying pressurized fluid;
   a wheel brake means receiving pressurized fluid from said master cylinder means and for restraining rotational movement of said wheel;
   controller cognizant of the rotational condition of said wheel and providing a signal when the rotational condition of said wheel is within present parameters;
   an actuator frame having a bore with means of fluid communication with said wheel brake means;
   a piston slidably sealably mounted with said bore for providing a variable control volume in communication with said wheel brake means and thereby modulating the pressure therein;
   a nut operatively associated with said piston and slidably mounted within said bore in a non-rotative fashion;
   a power screw projecting into said nut and threadedly engaged within in an efficient manner, said power screw having a
   reversible motor means for powering said power screw, said motor means being responsive to signals given by said controller;

a non-rotative sleeve located between said power screw and said motor means in a fixed position, said sleeve having an inner diameter of a first value;

a coil spring having a free outer diameter of a second value generally greater than said first value, said coil spring being captured within said non-rotative sleeve, and said coil spring having a tang on each end;

a driver member with a torsion transfer portion, said driver member having a rotational axis, said driver member having an angular position in correspondence with the angular position of said motor means, said driver member having first and second contact surfaces for imparting force to said spring tangs to cause said tangs to release and to allow said spring to have sliding movement within said non-rotative sleeve in both directions;

a driven member with an angular position in correspondence with the angular position of said power screw, said driven member having a rotational axis generally coterminous with said rotational axis of said driver member and said driven member having a torsion transfer portion for receiving force imparted by said driver member torsion transfer portion for transferring torque from said driver member to said power screw, said driven member having at least one contact surface for imparting force in the opposite angular direction on said spring tang said driver contact surface imparts force on said spring tang to cause said spring to radially expand and lock within said sleeve to prevent torque from said power screw being transferred to said motor means when said piston is moving away from a position more adjacent to said means of fluid communication of said actuator frame bore with said wheel brake means by fluid pressure within bore.

19. A vehicle wheel anti-lock braking system (ABS) comprising:

master cylinder means for supplying pressurized fluid;

a wheel bake means receiving pressurized fluid from said master cylinder means and for restraining rotational movement of said wheel;

an ABS controller cognizant of the rotational condition of said wheel and providing a signal when the rotational condition of said wheel is within present parameters;

an actuator frame having a bore with means of fluid communication with said wheel brake means;

a piston slidably sealably mounted with said bore for providing a variable control volume in communication with said wheel brake means and thereby modulating the pressure therein;

a nut operatively associated with said piston and slidably mounted within said bore in a non-rotative fashion;

a power screw projecting into said nut and threadably engaged within in an efficient manner, said power screw having a fixed rotational axis with respect to said actuator frame;

reversible motor means for powering said power screw, said motor means being responsive to signals given by said controller;

a non-rotative sleeve located between said power screw and said motor means in a fixed position, said sleeve having an inner diameter of a first value;

a coil spring having a free outer diameter of a second value generally greater than said first value, said coil spring being captured within said non-rotative sleeve, and said coil spring having a tang on each end;

a driver member with a torsion transfer portion, said driver member having a rotational axis, said driver member having an angular position in correspondence with the angular position of said motor means, said driver member having first and second contact surfaces for imparting force to said spring tangs to cause said tangs to release and to allow said spring to have sliding movement within said non-rotative sleeve in both directions;

a driven member with an angular position in correspondence with the angular position of said power screw, said driven member having a rotational axis generally coterminous with said rotational axis of said driver member and said driven member having a torsion transfer portion for receiving force imparted by said driver member torsion transfer portion for transferring torque from said driver member to said power screw, said driven member having at least one contact surface for imparting force in the opposite angular direction on said spring tang said driver contact surface imparts force on said spring tang to cause said spring to radially expand and lock within said sleeve to prevent torque from said power screw being transferred to said motor means when said piston is moving away from a position arm adjacent to said means of fluid communication of said actuator frame bore with said wheel brake means by fluid pressure within bore.

20. A vehicle wheel anti-lock braking system (ABS) comprising:

master cylinder means for supplying pressurized fluid;

a wheel brake means receiving pressurized fluid from said master cylinder means and for restraining rotational movement of said wheel;

an ABS controller cognizant of the rotational condition of said wheel and providing a signal when the rotational condition of said wheel is within preset parameters;

an actuator frame having a bore with means of fluid communication with said wheel brake means, said frame also having means of fluid communication with said master cylinder;

a check valve within said bore;

a piston slidably sealably mounted within said bore for providing a variable control volume in communication with said wheel brake means and thereby modulating the pressure therein and opening said check valve when adjacent thereto to permit fluid communication between wheel brake and said master cylinder;

a nut operatively associated with said piston and slidably mounted within said bore in a non-rotative fashion;

a power screw projecting into said nut and threadedly engaged within in an efficient manner, said power screw having a fixed rotational axis with respect to said actuator frame;

reversible motor means for powering said power screw, said motor means being responsive to signals given by said controller;

a non-rotative sleeve located between said power screw and said motor means in a fixed position, said sleeve having an inner diameter of a first value;

a coil spring having a free outer diameter of a second value generally greater than said first valve, said coil spring being captured within said non-rotative sleeve, and said coil spring having a tang on each end;

a driver member with a torsion transfer portion projecting into said non-rotative sleeve, said driver member having a rotational axis, said driver member having an angular position in correspondence with the angular position of said motor means, said driver member having first and second contact surfaces for engagement with said spring tangs to cause said tangs to release and to allow said spring to have sliding movement within said non-rotative sleeve in both directions;

a driven member with an angular position in correspondence with the angular position of said power screw, said driven member projecting into said sleeve and having a rotational axis generally coterminous with said rotational axis of said driver member and said driven member having projecting into said sleeve a torsion transfer portion for making contact with said driver member torsion transfer portion for transferring torque from said driver member to said power screw, said driven member having at least one contact surface for making contact on said spring tang on the opposite side of said spring tang said driver contact surface makes contact on to cause said spring to radially expand and lock within said sleeve to prevent torque from said power screw being transferred to said motor means when said piston is moving away from a position more adjacent to said means of fluid communication of said actuator frame bore with said wheel brake means by fluid pressure within bore.

21. A vehicle wheel anti-lock braking system (ABS) comprising:

a master cylinder for supplying pressurized fluid to said system;

a wheel brake receiving pressurized fluid from said master cylinder for restraining rotational movement of said wheel;

an ABS controller cognizant of the rotational condition of said wheel and providing a signal when said wheel rotational condition is within preset ABS parameters;

an actuator frame having a longitudinal bore with a fluid connection with said wheel brake and with said isolation valve, said actuator frame also having a check valve means for preventing fluid communication from said master cylinder to said wheel brake via said longitudinal bore;

a piston slidably sealably mounted within said longitudinal bore providing a variable control volume in communication with said wheel brake and thereby modulating the pressure therein, said piston also having means to open said check valve when said piston is at an extreme position closely adjacent to said longitudinal bore fluid connection with said wheel brake;

a nut operatively associated with said piston slidably mounted within said longitudinal bore in a non-rotative fashion;

a power screw having a fixed rotational axis with respect to said actuator frame and mounted by bearings therein, said power screw projecting into said nut and being threadedly engaged therewith in an efficient manner;

a reversible motor for powering said power screw said motor having a rotor and, said motor being responsive to signals given by said controller;

a sleeve located adjacent to said motor in a fixed position having an inner diameter of a first value;

a multiple turn coil spring having a square cross-sectional area with a free outer diameter of a second value greater than said first value lockably captured within said rotative sleeve, said coil spring having a tang on each end;

a driver fixably connected with said motor rotor having torsion transfer portion projecting into said non-rotative sleeve and having a rotational axis and an angular position in correspondence with the angular position of said motor rotor, said driver having first and second contact surfaces for engaging said spring tangs to cause said spring to release and to have sliding movement within said non-rotative sleeve in both directions;

a first gear gearably connected with a gear train, the last of said gears being connected with said power screw, said first gear having an angular position in correspondence with the angular position of said power screw, said gear having a lobe projecting into said sleeve and having a rotational axis generally coterminous with said rotational axis of said driver transferring torque from said driver to said power screw, via contact between said driver torsion transfer portion and said first gear lobe, said lobe making contact with one of said spring tangs, on the opposite side of said tang, said driver contact surface makes contact on for causing said spring to radially expand and lock within said sleeve to prevent torque from said power screw being transferred to said motor when said piston is moving away from its extreme position adjacent to said actuator frame fluid connection with said wheel brake, and said first gear having an angular back drive from its position in correspondence with the extreme positions of said piston, before said first gear makes contact with said spring tang when said spring tang is in a position determined by the location of the contact surface on said driver at said extreme position, said first gear not being able to go back far enough wherein said piston allows said check valve means to close and said tang is isolated from contact with said first gear when said driver has engaged said tang to release said spring.

* * * * *